United States Patent [19]

Cowden

[11] 3,821,766

[45] June 28, 1974

[54] PHOTOGRAPHIC STUDIO LIGHTS

[76] Inventor: James W. Cowden, Aguanga, Calif. 92302

[22] Filed: Jan. 12, 1973

[21] Appl. No.: 323,201

[52] U.S. Cl. .................................. 95/82, 240/2 C
[51] Int. Cl. .......................................... G03b 15/07
[58] Field of Search ................ 240/2 C, 9 R, 3, 2 S; 95/82

[56] References Cited
UNITED STATES PATENTS

| 1,568,092 | 1/1926 | Seng | 240/2 S |
|---|---|---|---|
| 1,923,741 | 8/1933 | Murdock et al. | 240/3 |
| 2,076,074 | 4/1937 | Douglas | 240/9 R X |
| 2,659,038 | 11/1943 | Heyer | 240/9 R X |
| 2,765,705 | 10/1956 | Simjion | 95/82 X |
| 3,516,343 | 6/1970 | Tunney | 95/82 |
| 3,604,913 | 9/1971 | Crete | 240/2 C |

Primary Examiner—Samuel S. Matthews
Assistant Examiner—E. M. Bero
Attorney, Agent, or Firm—Herbert E. Kidder

[57] ABSTRACT

A photographic studio lighting system comprising a plurality of lights (preferably strobe lights) including two fill-in lights arranged on opposite sides of the camera, and a main, or modeling light mounted on an overhead boom that is swingable about a vertical axis located directly above the subject. Other lights, such as hair high-light and background light, may also be included. A switch actuated by movement of the boom past the axis of the camera lens causes the fill-in light on the same side of the camera lens axis as the main light to be inactivated, and the fill-in light on the opposite side of the camera to be activated. Thus, when the main light is on the right-hand side of the subject, the fill-in light on the subject's left-hand side will be activated, and the fill-in light on the subject's right-hand side will be inactivated. Pressing the camera shutter release causes the overhead main light and the activated fill-in light to flash, as well as any other lights that are being used.

3 Claims, 4 Drawing Figures

PATENTED JUN 28 1974 3,821,766
FIG. 1.
FIG. 2.
FIG. 3.
FIG. 4.
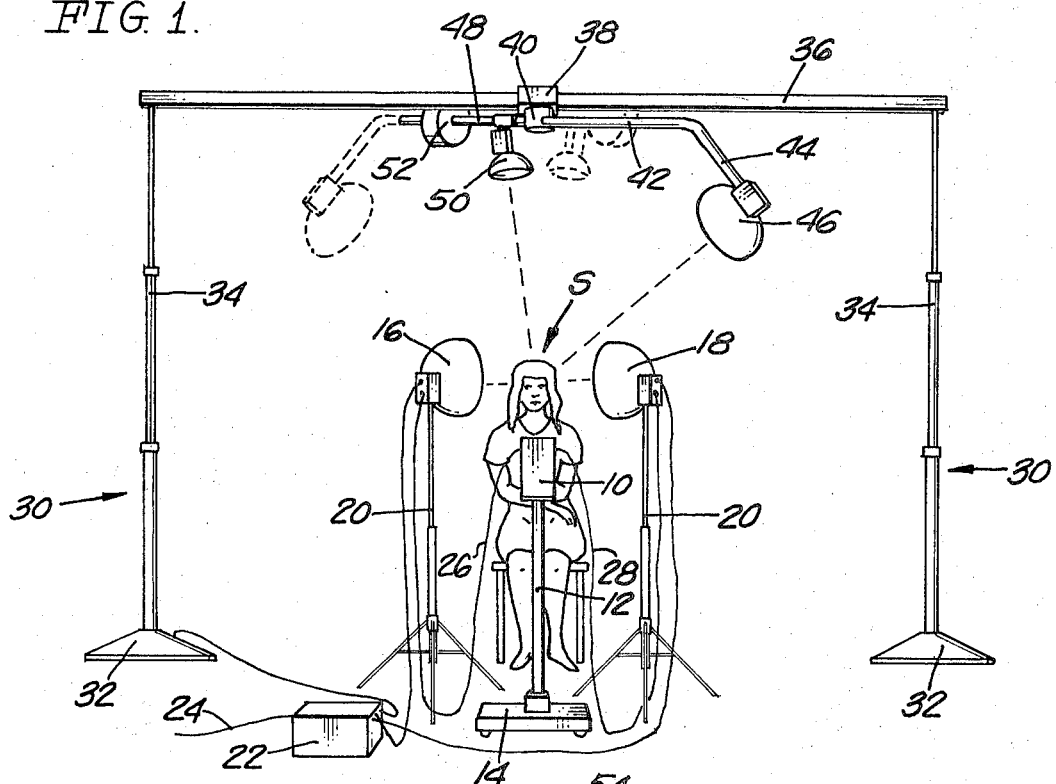
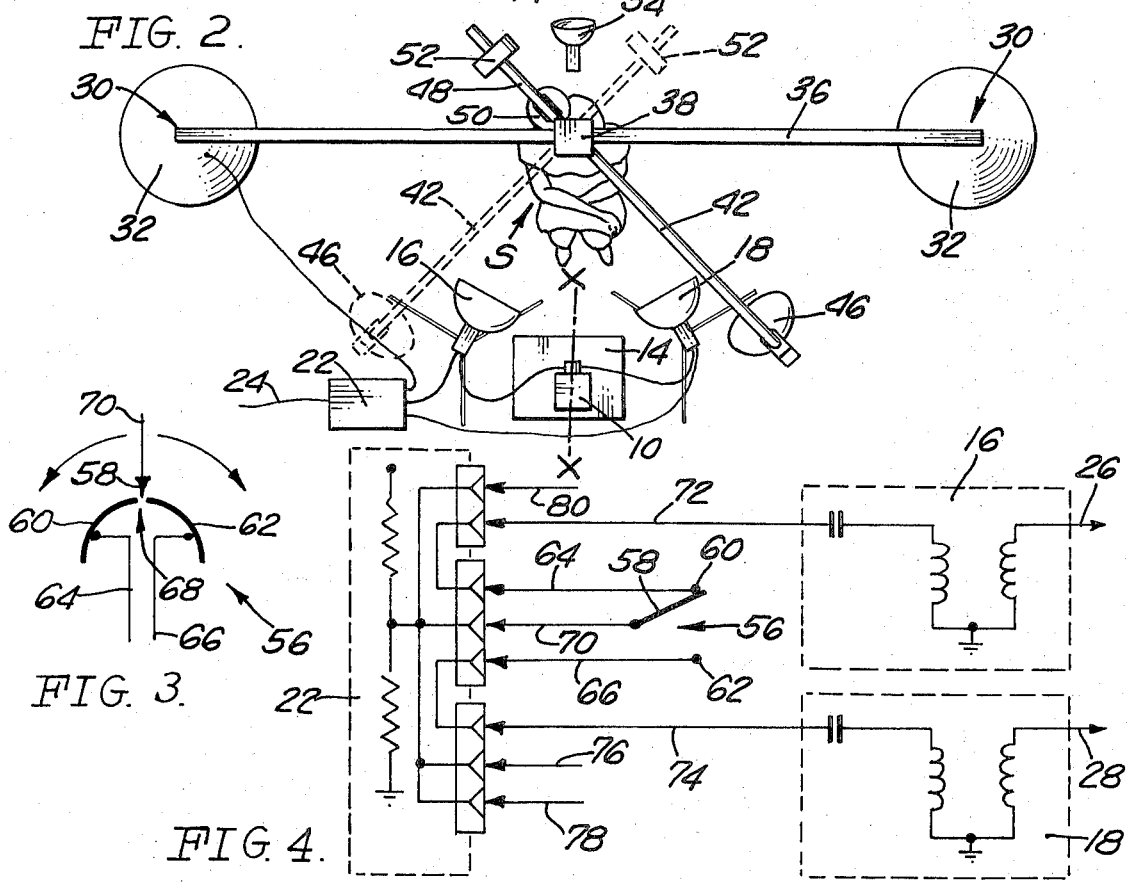

3,821,766

PHOTOGRAPHIC STUDIO LIGHTS

BACKGROUND OF THE INVENTION

The present invention relates to photographic studio lighting systems, and more particularly to a lighting system for portrait work, which produces extremely uniform results from the standpoint of color balance, so that large numbers of color portraits, such as school portraits, may be taken, which can be processed and printed with a minimum of attention to color balance after an initial color balance for a series of negatives has once been achieved.

One of the problems of color portrait photography, particularly where large numbers of pictures are taken in a relatively short period of time, as when taking school or military portraits, is that any slight variation in the placement of the lights with respect to one another may result in change of color balance between one negative and another, which requires that the processing laboratory make color balance tests of each negative. This is a time consuming procedure that adds considerably to the cost of the color prints. Success in bidding for contracts on volume color portrait work is dependent largely upon the cost of making the prints, and this, in turn, depends upon the uniformity of color balance in a batch of negatives. Thus, if the color balance can be kept extremely uniform in a batch of negatives, the cost of making the prints can be held down to a minimum, enabling the photographer to bid low on the contracts and still produce uniformly excellent color portraits.

SUMMARY OF THE INVENTION

The primary object of the present invention is to provide a photographic studio lighting system that provides lighting of such uniform color balance that it is possible to make large numbers of pictures and have them all processed in the same manner after making suitable color balance adjustments for the first negative of a batch.

More specifically, it is an important object of the invention to provide a studio lighting system wherein a pair of fill-in lights arranged on opposite sides of the camera are selectively switched on or off automatically by positioning the overhead main, or modeling light on one side or the other of the camera lens axis. The term "modeling light" as used hereinafter means main or modeling light. Thus, if the modeling light is positioned on the right-hand side of the subject, the fill-in light on the subject's left-hand side is turned on, and the one on his right-hand side is turned off. Swinging the modeling light over to the opposite side of the camera lens axis reverses the fill-in lights, causing the left-hand fill-in light to be turned off, and the right-hand one to be turned on.

These and other objects and advantages of the present invention will become apparent to those skilled in the art from the following detailed description of the preferred embodiment thereof, in conjunction with the accompanying drawings.

BRIEF DESCRIPTION OF THE DRAWINGS

FIG. 1 is a somewhat schematic, perspective view of a photographic studio lighting system embodying the invention;

FIG. 2 is a top plan view of the same;

FIG. 3 is a schematic circuit diagram of the switch in the hub of the boom-supported modeling light; and FIG. 4 is a circuit diagram of the power pack, the two fill-in lights, and the switch of FIG. 3, the latter being shown in a slightly different form than it appears in FIG. 3.

DESCRIPTION OF THE PREFERRED EMBODIMENT

In the drawings, the portrait camera is designated by the reference numeral 10, and may be mounted on a pedestal 12, which extends upwardly from a wheeled dolly 14. The subject S is seated directly in front of the camera, on the axis X—X of the camera lens.

Standing equidistantly from the camera on either side thereof and at about the level of the subject's eyes are fill-in lights 16 and 18. Each of the lights 16, 18 is carried on an adjustable tripod stand 20. The lights 16 and 18, as well as all of the other lights used in the set-up, are preferably strobe lights, which emit high-intensity flashes of light each time the shutter of the camera is tripped. Electrical discharges for the strobe lights are supplied by a power-pack 22, which is connected by an extension wire 24 to any conventional electrical outlet. Other wires 26 and 28 lead from the camera shutter mechanism to the lights 16, 18, and to the other lights of the system, and these carry the signal impulse that triggers the lights when the shutter is tripped.

Disposed on opposite sides of the subject S are two standards 30, each comprising a base 32 and telescoping post 34. A cross bar 36 is mounted on the top ends of the posts 34 and passes directly over the subject S as shown in FIG. 2. Slidably mounted on the cross bar 36 is a carrier 38 having a rotatable hub 40 on its underside. The carrier 38 is positioned on the cross bar 36 directly over the subject S.

Passing diametrically through the hub 40 is a tubular metal boom 42 having a downwardly and outwardly bent portion 44 at its outer end, upon which is carried the modeling light 46. Modeling light 46 is aimed so that it points downwardly toward the subject's face, no matter what the position of the light.

Boom 42 projects rearwardly behind the hub 40, and mounted on this rearwardly projecting portion 48 is the hair highlight 50, which shines directly down onto the subject's hair. A counterweight 52 at the rear end of the boom portion 48 provides balance for the modeling light 46. A background light 54 may be mounted on the floor behind the subject, as shown in FIG. 2, to illuminate the background.

Contained within the hub 40 is a switch 56, shown schematically in FIG. 3, which includes contacts 58, 60 and 62. The switch 56 may take various forms, and the illustration in FIG. 3 is intended only as a schematic representation. The function of switch 56 is to activate one of the fill-in lights 16, 18 and inactivate the other when the modeling light 46 is swung from one side of the camera lens axis to the other. More specifically, switch 56 causes the fill-in light 16 (to the left of the subject, as viewed in FIG. 1) to be connected to the flasher circuit when the modeling light 46 is to the right, and fill-in light 18 (to the right of the subject) to be disconnected from the flasher circuit, so that it will not flash when the camera shutter is tripped. Switch 56 might take the form of a mercury switch, with suitable tilting mechanism that functions to tilt the switch one way or the other when the boom 42 swings past the camera lens axis X—X.

In FIG. 3, contact 58 is connected to the rotatable hub 40 and turns therewith. Contacts 60 and 62 are stationary arcuate contacts that are wiped by contact 58. Contact 60 is connected by wire 64 to one of the fill-in lights 16, 18, and contact 62 is connected by wire 66 to the other fill-in light. There is a narrow gap 68 between the adjacent ends of the contacts 60, 62, and the contact 58 passes over this gap when the boom 42 is directly over and parallel to axis X—X. Thus, as hub 40, with boom 42 and modeling light 46 swings from one side of the subject to the other, contact 58 wipes first on contact 60 and then on contact 62 (or vice versa) therby closing the flasher circuit to the fill-in light on the opposite side of axis X—X, and opening the flasher circuit to the fill-in light on the same side of the axis.

FIG. 4 is a schematic representation of the circuit in the power pack 22, switch 56, and fill-in lights 16 and 18. Power pack 22 has a plurality of sockets to receive connector plugs attached to wires going to the various lights. Wire 70 goes from the power pack 22 to movable contact 58 of the switch 56. Wire 64 goes from contact 60 to the power pack, and is connected through another wire 72 to strobe light 16. Wire 66 goes from contact 62 to the power pack, and is connected through another wire 74 to strobe light 18. Wire 76 goes to the modeling light 46; wire 78 goes to the hair high-light 50; and wire 80 goes to the background light 54. With the circuit as shown in FIG. 4. The fill-in light 16 is connected to the flasher circuit by switch 56, and is flashed with the modeling light 46, whereas fill-in light 18 is inactivated by reason of the open switch 56, and does not flash. When the boom is swung over to place the modeling light 46 on the other side of the subject, fill-in light 16 is inactivated, and light 18 is activated. The switching of the fill-in lights is done by swinging of the boom 42 past the camera lens axis, producing the correct relationship between modeling light and fill-in light for any position of the modeling light. As a result, the color balance remains the same for all pictures taken with the studio light set-up shown herein, and only one color balance test need be made for an entire batch of negatives.

While I have shown and described in considerable detail what I believe to be the preferred form of my invention, it will be understood by those skilled in the art that various changes may be made within the scope of the following claims. For example, the invention is not limited to strobe lights, but might be used with any kind of photographic lights.

I claim:

1. The combination of a photographic studio lighting system, a subject location, and a camera having a shutter release mechanism operable to energize lights and an optical axis, said camera being trained on said subject location, and said system comprising:
   a pair of fill-in lights disposed on opposite sides of the optical axis of the camera lens;
   a boom supported for horizontal swinging movement about a pivot axis substantially directly above said subject location;
   a main light mounted on said boom;
   circuit means connected to said lights and operable to supply electrical energy to the lights to cause them to flash when the camera shutter is opened; and
   switch means serially connected to said circuit means and actuated by movement of said boom past said optical axis of the camera for disconnecting the one fill-in light on the same side of the optical axis as said main light, from said circuit means, and simultaneously connecting the other fill-in light on he opposite side of the optical axis to said circuit means, whereby said other fill-in light is caused to flash with said main light, and said one fill-in light is not flashed.

2. The photographic studio lighting system of claim 1, wherein said circuit means is connected to said shutter release mechanism, and is actuated by the tripping of the camera shutter.

3. The photographic studio lighting system of claim 1, including an overhead support, a hub rotatably mounted on said overhead support, and wherein said boom is supported by said hub, and said switch means includes two contacts connected one to each of said fill-in lights, and a third contact movable from one of said two contacts to the other, said third contact being actuated by rotation of said hub and being switched from one to the other of said two contacts as said boom swings across said optical axis of the camera.

* * * * *